US 6,792,751 B2

(12) United States Patent
Kokusyo et al.

(10) Patent No.: US 6,792,751 B2
(45) Date of Patent: Sep. 21, 2004

(54) EXHAUST GAS PURIFICATION DEVICE AND METHOD FOR DIESEL ENGINE (75) Inventors: Hajime Kokusyo, Yokosuka (JP); Yasuhisa Kitahara, Yokohama (JP); Hiroaki Kaneko, Yokohama (JP); Motohisa Kamijo, East Windsor, CT (US)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/269,043

(22) Filed: Oct. 11, 2002

(65) Prior Publication Data
US 2003/0070425 A1 Apr. 17, 2003

(30) Foreign Application Priority Data
Oct. 12, 2001 (JP) ........................ 2001-315879

(51) Int. Cl.⁷ ................................ F01N 3/00
(52) U.S. Cl. ............... 60/295; 60/285; 60/286; 60/297
(58) Field of Search ................ 60/280, 285, 286, 60/295, 297, 303

(56) References Cited

U.S. PATENT DOCUMENTS

| 5,642,705 | A | * | 7/1997 | Morikawa et al. | 123/300 |
| 5,746,989 | A | * | 5/1998 | Murachi et al. | 423/213.7 |
| 5,974,791 | A | * | 11/1999 | Hirota et al. | 60/276 |
| 6,173,571 | B1 | * | 1/2001 | Kaneko et al. | 60/286 |
| 6,233,925 | B1 | * | 5/2001 | Hirota et al. | 60/285 |
| 6,378,297 | B1 | * | 4/2002 | Ito et al. | 60/284 |

FOREIGN PATENT DOCUMENTS

| GB | 2 342 056 A | 4/2000 |
| JP | 2000-154713 A | 6/2000 |
| JP | 2001-59440 A | 3/2002 |

* cited by examiner

*Primary Examiner*—Binh Q. Tran
(74) *Attorney, Agent, or Firm*—Foley & Lardner LLP (57) ABSTRACT

In order to improve performance of NOx reduction, an additional fuel injection immediately after a main fuel injection is performed. By such additional fuel injection, hydrogen ($H_2$) is supplied to a NOx trap catalyst. And in order to prevent engine output torque from varying by the additional fuel injection, the main fuel injection is controlled by whether the additional fuel injection is performed.

15 Claims, 9 Drawing Sheets

EXHAUST GAS PURIFICATION DEVICE AND METHOD FOR DIESEL ENGINE

CROSS-REFERENCE TO RELATED PATENT APPLICATIONS

BACKGROUND OF THE INVENTION

1. Field of the Invention

The present invention relates to an exhaust gas purification device comprising a NOx trap catalyst for an internal combustion engine. More particularly, the invention relates to improving the NOx reduction performance of the device.

2. Description of the Related Art

JP-A 2001-59440 discloses an exhaust gas purification device comprising a NOx trap catalyst. The catalyst has functions of trapping and storing nitrogen oxides (NOx) contained in exhaust gas, when an air-fuel ratio of exhaust gas is leaner than stoichiometric air-fuel ratio. The catalyst has other functions of releasing and reducing NOx, when the air-fuel ratio of exhaust gas is richer than stoichiometric air-fuel ratio. In this prior art, in order to make the air-fuel ratio of exhaust gas rich, after performing a main fuel injection, an additional fuel injection is performed.

JP-A 2000-154713 discloses that the performance related to NOx reduction improves by supplying hydrogen ($H_2$) to the NOx trap catalyst.

SUMMARY OF THE INVENTION

In diesel engine, it is possible to supply $H_2$ to the NOx trap catalyst by performing an additional fuel injection immediately after a main fuel injection. But, by performing such additional fuel injection, there are cases where the engine output torque varies.

The present invention provides a solution to the above-mentioned torque variation.

According to present invention, there is provided an exhaust gas purification device for diesel engine. The engine has an injector injecting fuel directly into combustion chamber of the engine. The exhaust gas purification device comprises a NOx trap catalyst and a controller. The NOx trap catalyst traps nitrogen oxides (NOx) contained in exhaust gas when an air-fuel ratio of exhaust gas is leaner than stoichiometric air-fuel ratio, and reduces NOx stored in the catalyst when the air-fuel ratio of exhaust gas is richer than stoichiometric air-fuel ratio. The controller is programmed to make a judgment as to whether the catalyst should be regenerated; calculate instruction values regarding the main fuel injection in accordance with engine operating conditions and the judgment; calculate instruction values regarding additional fuel injection, when the judgment shows that the catalyst should be regenerated; and control the injector according to the instruction values about the main and the additional fuel injection, in order to regenerate the catalyst.

DETAILED DESCRIPTION OF THE PREFERRED EMBODIMENTS

Figure 1:
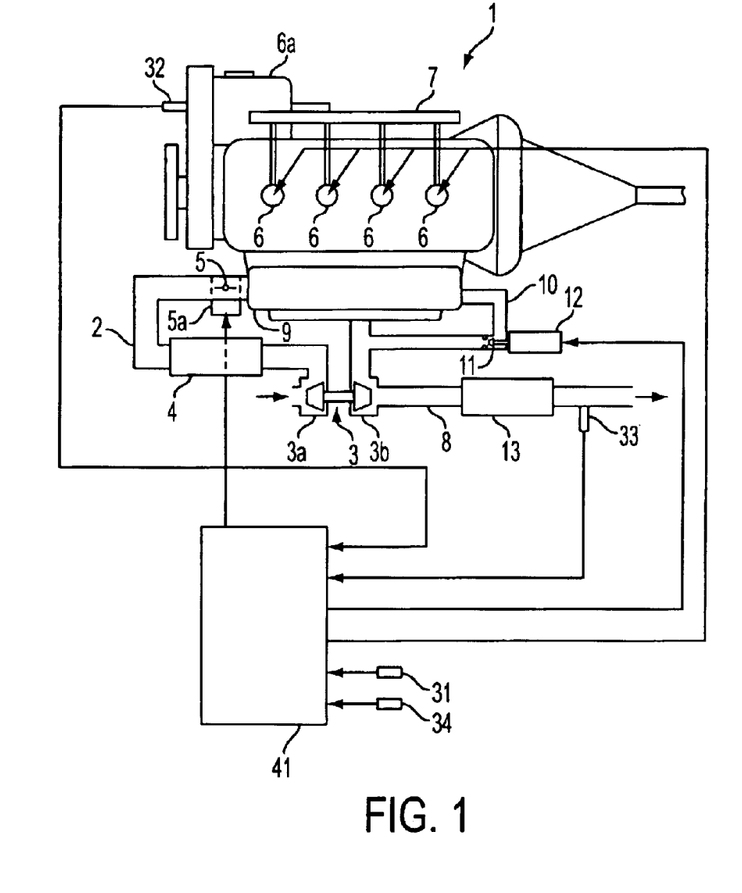
FIG. 1 is a schematic view of an internal combustion engine to which the present invention is practically applied.

FIG. 1 shows schematically a diesel engine 1 to which the present invention is practically applied. The engine 1 takes in air through an intake passage 2. The engine 1 is provided with a variable nozzle type turbocharger 3, and the intake air is compressed by compressor 3a of the turbocharger 3. An intercooler 4 is installed in the intake passage 2 to cool the intake air compressed by compressor 3a.

A throttle valve 5 driven by a drive unit 5a is installed in the intake passage 2 to adjust flow rate of the intake air. The intake air through the throttle valve 5 flows into a surge tank 9 and is distributed to each cylinder from the surge tank 9.

A fuel injector 6 of each cylinder is installed in the center of a combustion chamber of each cylinder. Fuel pressurized by a fuel feed pump 6a is supplied to the injector 6 through a common-rail 7. The injector 6 of all cylinders is connected to the common-rail 7. Fuel pressure in the common-rail 7 is always kept constant. The injector 6 is driven according to a pulse signal, and fuel is directly injected into the combustion chamber.

A turbine 3b of the turbocharger 3 is installed in an exhaust passage 8. The exhaust passage 8 and the surge tank 9 are connected through an Exhaust-Gas-Recirculation (EGR) passage 10. An EGR valve 11 driven by a drive unit 12 is installed in the EGR passage 10 to adjust flow rate of recirculating exhaust gas.

A NOx trap catalyst 13 is installed in the exhaust passage 8 downstream of the turbine 3b. The catalyst 13 has functions of trapping and storing nitrogen oxides (NOx) contained in exhaust gas, when air-fuel ratio of the exhaust gas is leaner than stoichiometric air-fuel ratio. Sulfur is also contained in the exhaust gas, and the function of trapping is effective to sulfur too. The catalyst 13 stores sulfur as SOx.

The catalyst 13 has other functions of releasing and reducing NOx. That is, the catalyst 13 releases NOx which were stored, when the air-fuel ratio of the exhaust gas is richer than stoichiometric air-fuel ratio. NOx released from the catalyst 13 is reduced on the catalyst 13. The functions of releasing and reducing are effective to SOx too, when the air-fuel ratio of the exhaust gas is richer than stoichiometric air-fuel ratio and temperature of the catalyst 13 is high.

A control system of the engine 1 is comprised of detectors and an Engine-Control-Unit (ECU) 41. There are an air-flow-meter 31 which detects flow rate of the intake air, a crank-angle sensor 32 which detects crank-angle of the engine 1, a temperature sensor 33 which detects temperature of the exhaust gas which has passed through the catalyst 13, and an accelerator sensor 34 which detects an operator's accelerator control input. Output signals of the detectors are sent to the ECU 41. The ECU 41 performs various processing based on the signals, and sends control signals to the drive unit 5a of the throttle valve 5, the injector 6, and the drive unit 12 of the EGR valve 11.

The engine 1 is operable with diffusion combustion or premixed combustion. Preferably, the diffusion combustion is chosen when engine operating conditions (engine rotation speed and engine load) are in Region A of FIG. 2, and the premixed combustion is chosen when the engine operating conditions are in Region B. The ECU 41 controls the injector 6 and the EGR valve 11 so that early fuel-injection timing is realized at time of the diffusion combustion, and late fuel-injection timing and large rate of EGR are realized at time of the premixed combustion.

Generally, with diesel engine, the fuel injected in the combustion chamber evaporates gradually. After a specific period after an injection start, the fuel that evaporated during the period burns at a stretch. This combustion is the premixed combustion, and this period is called "ignition delay period". Since temperature and pressure in the combustion chamber rise according to the premixed combustion, the fuel injected after the ignition delay period burns simultaneously with injection. This combustion is the diffusion combustion. Usually, since the ignition delay period is very short, almost the whole fuel burns in the form of diffusion combustion. Such a combustion form is only called "diffusion combustion" in this specification. On the other hand, if late injection timing and large rate of EGR are applied, the ignition delay period can be lengthened greatly. If the ignition delay period becomes longer than a fuel-injection period, almost the whole fuel will burn in the form of premixed combustion. Such a combustion form is only called "premixed combustion" in this specification. Generating of NOx and smoke (particulate matter) is inhibited at time of the premixed combustion.

Next, regeneration control of the NOx trap catalyst 13 is explained.

Since the air-fuel ratio of the diesel engine 1 is lean fundamentally, storage amount of NOx and SOx increases gradually. Since performance of the NOx trap catalyst 13 falls with the increase of the storage amount of NOx and SOx, it is necessary to perform control which makes the air-fuel ratio rich at suitable timing, and to carry out release and reduction of stored NOx or SOx. This control is called "regeneration control" in this specification.

In the present invention, in order to make the air-fuel ratio of the exhaust gas rich, after performing a main fuel injection, which is fuel injection for generating engine torque, an additional fuel injection is performed. This additional fuel injection is called "post fuel injection" in this specification.

In the combustion chamber after the post fuel injection is performed, three kinds of reactions arise as shown below.

1) Partial oxidation reaction $$(C_xH_y, O_2) \rightarrow (CO, CO_2, H_2, H_2O)$$

2) Dehydrogenation reaction

3) Cracking reaction

NOx released from the catalyst 13 by making the air-fuel ratio of the exhaust gas rich is reduced to $N_2$ by reducing agents contained in the exhaust gas. The reducing agents are fuel($C_xH_y$), CO and $H_2$. CO and $H_2$ are generated by the reactions. Since reduction power of $H_2$ is the strongest of three kinds of the reducing agents, it is preferable to supply as much $H_2$ as possible to the catalyst 13. This is especially important, when activation of reduction function of the catalyst 13 is not sufficient. Since a yield of $H_2$ in the dehydrogenation reaction and the cracking reaction is higher than a yield in the partial oxidation reaction, amount of $H_2$ to be supplied to the catalyst 13 increases by making the dehydrogenation reaction and the cracking reaction active. Since it is an endothermic reaction, heat energy is required for the dehydrogenation reaction. Since the cracking reaction needs to activate molecular movement, heat energy is required for it too. Therefore, it is effective to perform the post fuel injection when temperature in the combustion chamber is high.

Details of the catalyst regeneration control performed by the ECU 41 are explained next.

Figure 3A:
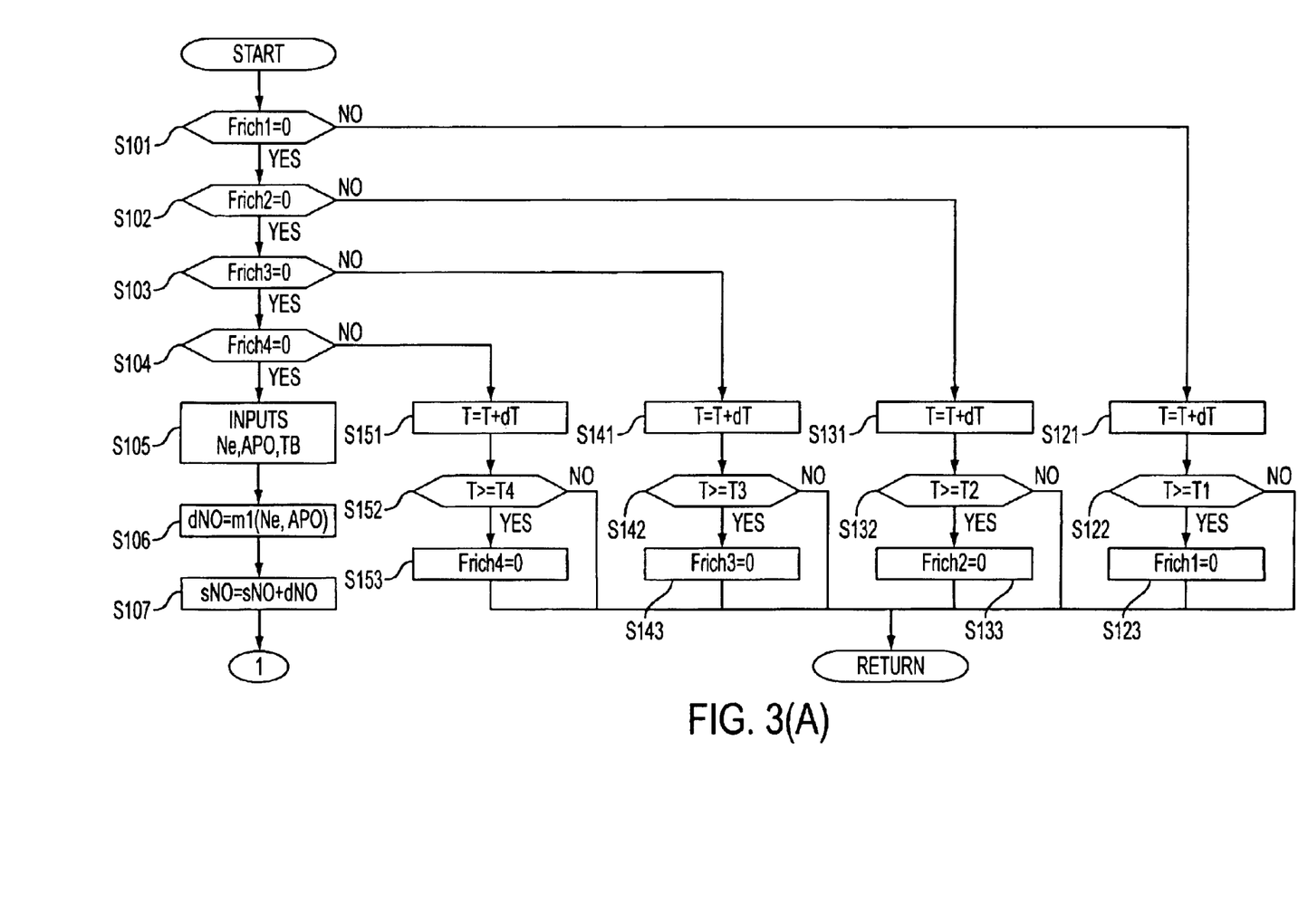
FIGS. 3(A) and 3(B) are together flow chart of a routine to be carried out by control unit to judge regeneration timing of catalyst.
Figure 3B:
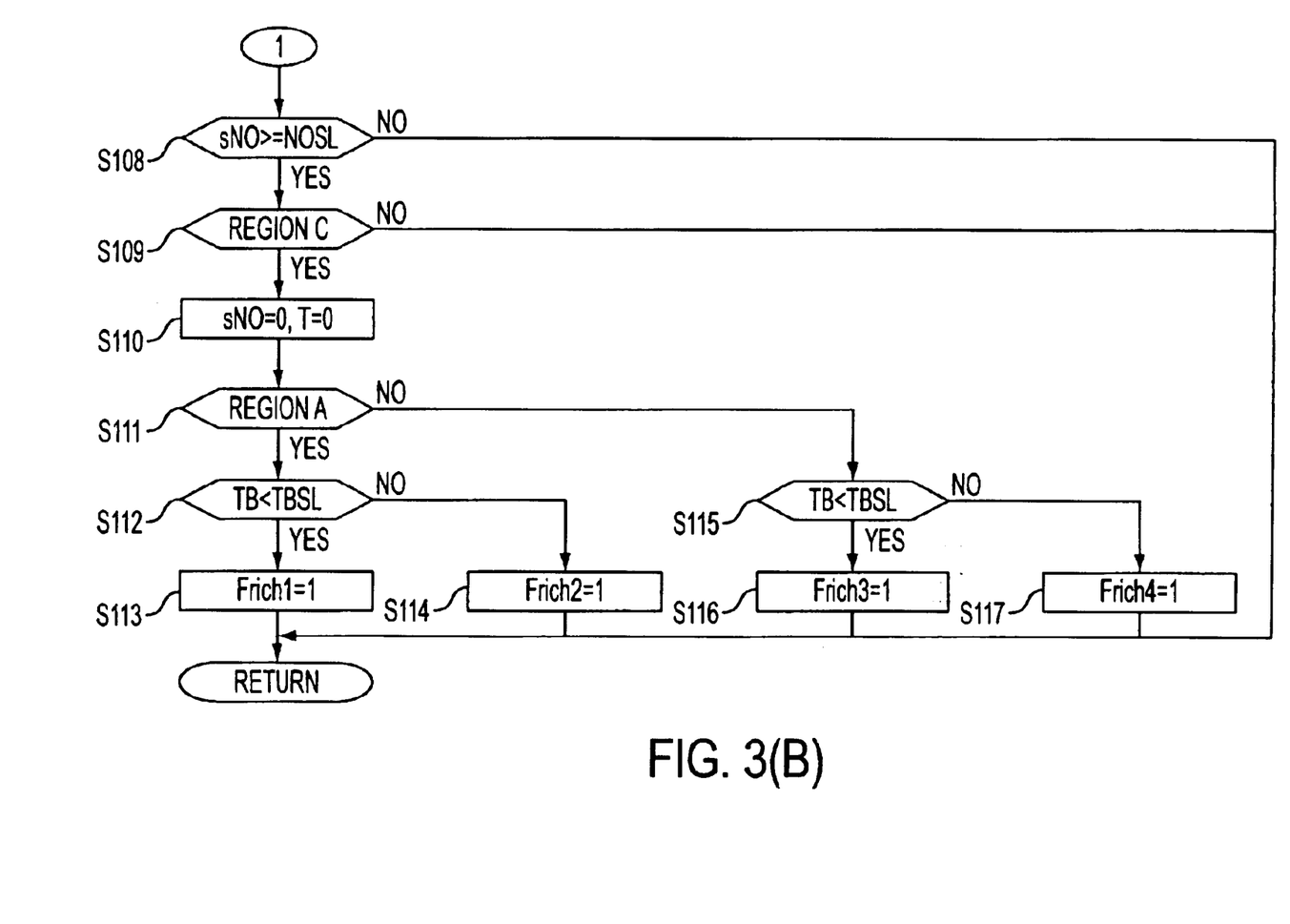

FIG. 3 is flow chart of a regeneration timing judging routine for the catalyst. This routine is carried out at regular intervals (for example 10 ms).

At step 101, a judgment is carried out as to whether a flag Frich1 is zero. The flag Frich1 is zero until setting at step 113 of this routine is carried out.

If the judgment result of step 101 is YES, processing flow progresses to step 102, and a judgment is carried out as to whether a flag Frich2 is zero. The flag Frich2 is zero until setting at step 114 of this routine is carried out.

If the judgment result of step 102 is YES, processing flow progresses to step 103, and a judgment is carried out as to whether a flag Frich3 is zero. The flag Frich3 is zero until setting at step 116 of this routine is carried out.

If the judgment result of step 103 is YES, processing flow progresses to step 104, and a judgment is carried out as to whether a flag Frich4 is zero. The flag Frich4 is zero until setting at step 117 of this routine is carried out.

If the judgment result of step 104 is YES, processing flow progresses to step 105, and input of engine operating conditions (engine rotating speed Ne and accelerator opening APO) and catalyst temperature TB is carried out. The engine rotating speed Ne is calculated beforehand based on the output signal of the crank-angle sensor 32, the accelerator opening APO is calculated beforehand based on the output signal of the accelerator sensor 34 and the catalyst temperature TB is calculated beforehand based on the output signal of temperature sensor 33. As temperature of the exhaust gas which has passed through the catalyst 13 correlates closely with temperature of the catalyst 13, it is possible to calculate temperature TB of the catalyst 13 based on the output signal of the temperature sensor 33. In alternative embodiments without use of temperature sensor, the catalyst temperature TB can be estimated from the engine operating condition.

At step 106, calculation of value dNO based on the engine operating conditions is carried out. The value dNO indicates amount of NOx which is trapped by the catalyst 13 during unit time. The unit time is the regular intervals (for example 10 ms). The calculation is realized by looking up dNO in a map in which data of dNO vs engine operating conditions has been stored.

At step 107, calculation of value sNO is carried out. The value sNO indicates total amount of NOx which has been stored in the catalyst 13. The newest value sNO is calculated by adding the value dNO to the last value sNO. As an alternative method, the value sNO can be calculated from accumulation rotation of the engine 1.

At step 108, a judgment is carried out as to whether the value sNO is more than a threshold NOSL. The threshold NOSL indicates critical amount of NOx, and when amount of NOx stored in the catalyst 13 exceeds the critical amount, it becomes impossible for the catalyst 13 to trap NOx satisfactorily. That is, when the value sNO exceeds the threshold NOSL, regeneration of the catalyst 13 is needed. If the judgment result of this step is NO, this routine is terminated.

Figure 4:
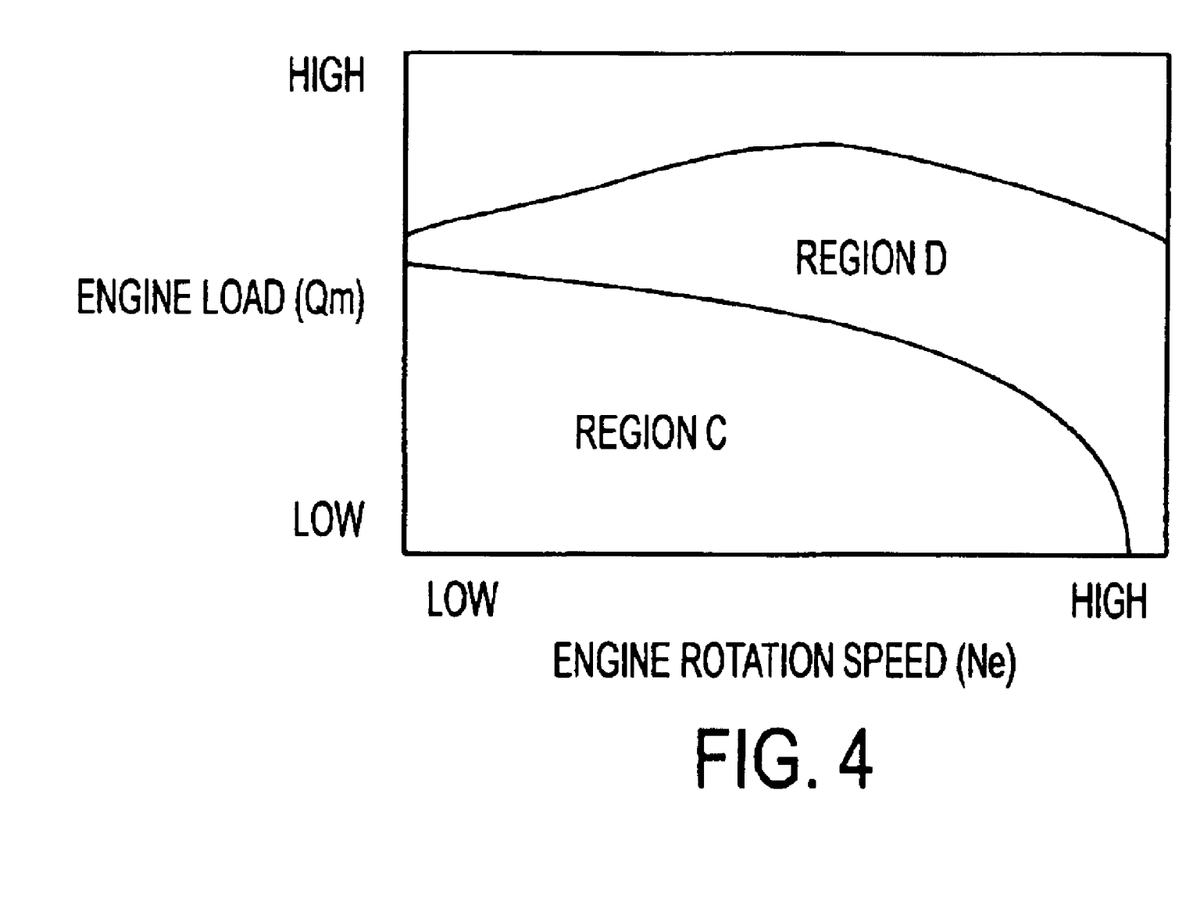
FIG. 4 is a map for judging appropriateness of performing rich control.

If the judgment result of step 108 is YES, processing flow progresses to step 109, and a judgment is carried out as to whether engine operating conditions (engine rotating speed and engine load) are in Region C of FIG. 4. The engine load used herein refers to amount of fuel of the main fuel injection. If the engine operating conditions are in the Region C, it is permitted to make the air-fuel ratio of the exhaust gas rich. If the engine operating conditions are in the Region D, it is not permitted to make the air-fuel ratio of the exhaust gas rich. If the judgment result of this step is NO, this routine is terminated.

If the judgment result of step 109 is YES, processing flow progresses to step 110, and resetting the value sNO to zero is carried out so that calculation of the value sNO can be resumed after catalyst regeneration. And resetting timer T to zero is also carried out. The timer T has a function of measuring the continuation period during which the exhaust gas is maintained at a rich air-fuel ratio.

Figure 2:
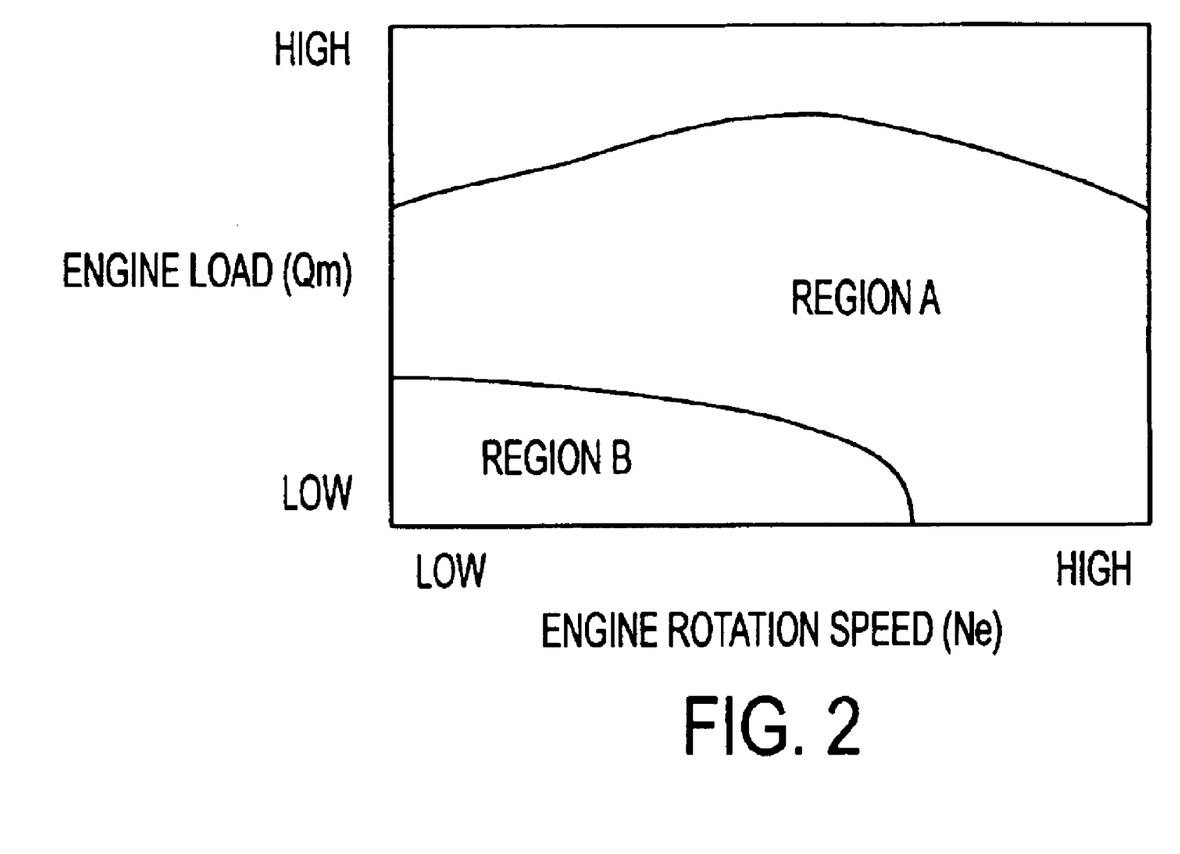
FIG. 2 is a map for choosing the form of combustion.

At step 111, a judgment is carried out as to whether engine operating conditions are in the Region A of FIG. 2. As mentioned above, the Region A is a region which performs the diffusion combustion.

If the judgment result of step 111 is YES, processing flow progresses to step 112, and a judgment is carried out as to whether the catalyst temperature TB is less than threshold TBSL. The threshold TBSL indicates critical temperature of the catalyst 13, and is 250° C. in one example. When temperature of the catalyst 13 is above the critical temperature, activation of reduction function of the catalyst 13 is sufficient, but when the temperature is lower than the critical temperature, the activation is not sufficient.

If the judgment result of step 112 is YES, processing flow progresses to step 113, and setting the flag Frich1 to 1 is carried out. The flag Frich1 is a flag which shows "first rich control" is performed. The first rich control includes control of the main fuel injection and control of the post fuel injection. With the first rich control, combustion form of the main fuel injection is the diffusion combustion, amount of the main fuel injection is normal amount, timing of the main fuel injection is slightly later than normal timing, amount of the post fuel injection is enough to make the air-fuel ratio of the exhaust gas rich, and timing of the post fuel injection is close to the main fuel injection timing.

If the judgment result of step 112 is NO, processing flow progresses to step 114, and setting the flag Frich2 to 1 is carried out. The flag Frich2 is a flag which shows "second rich control" is performed. With the second rich control, combustion form of the main fuel injection is the diffusion combustion, the main fuel injection amount is normal amount, the main fuel injection timing is normal timing, the post fuel injection amount is enough to make the air-fuel ratio of the exhaust gas rich, and the post fuel injection timing is far from the main fuel injection timing.

If the judgment result of step 111 at which the judgment is carried out as to whether engine operating conditions are in the Region A is NO, processing flow progresses to step 115, and a judgment is carried out as to whether the catalyst temperature TB is less than the threshold TBSL.

If the judgment result of step 115 is YES, processing flow progresses to step 116, and setting the flag Frich3 to 1 is carried out. The flag Frich3 is a flag which shows "third rich control" is performed. With the third rich control, combustion form of the main fuel injection is the premixed combustion, the main fuel injection amount is slightly less than normal amount, the main fuel injection timing is normal timing, the post fuel injection amount is enough to make the air-fuel ratio of the exhaust gas rich, and the post fuel injection timing is close to the main fuel injection timing.

If the judgment result of step 115 is NO, processing flow progresses to step 117, and setting the flag Frich4 to 1 is carried out. The flag Frich4 is a flag which shows "fourth rich control" is performed. With the fourth rich control, combustion form of the main fuel injection is the premixed combustion, the main fuel injection amount is normal amount, the main fuel injection timing is normal timing, the post fuel injection amount is enough to make the air-fuel ratio of the exhaust gas rich, and the post fuel injection timing is far from the main fuel injection timing.

If the judgment result of step 101 at which the judgment is carried out as to whether the flag Frich1 is zero is NO, processing flow progresses to step 121, and updating of the timer T by adding value dT to timer T is carried out. The value dT corresponds to the regular intervals (for example 10 ms).

At step 122, a judgment is carried out as to whether the timer T is more than a threshold T1. When the continuation period maintained to rich air-fuel ratio by the first rich control reaches the threshold T1, regeneration of the catalyst 13 is complete.

If the judgment result of step 122 is YES, processing flow progresses to step 123, and resetting the flag Frich1 to zero is carried out. And this routine is terminated. If the judgment result of step 122 is NO, this routine is terminated without changing the flag Frich1.

If the judgment result of step 102 at which the judgment is carried out as to whether the flag Frich2 is zero is NO, processing flow progresses to step 131, and updating of the timer T is carried out.

At step 132, a judgment is carried out as to whether the timer T is more than a threshold T2. When the continuation period maintained to rich air-fuel ratio by the second rich control reaches the threshold T2, regeneration of the catalyst 13 is complete.

If the judgment result of step 132 is YES, processing flow progresses to step 133, and resetting the flag Frich2 to zero is carried out. And this routine is terminated. If the judgment result of step 132 is NO, this routine is terminated without changing the flag Frich2.

If the judgment result of step 103 at which the judgment is carried out as to whether the flag Frich3 is zero is NO, processing flow progresses to step 141, and updating of the timer T is carried out.

At step 142, a judgment is carried out as to whether the timer T is more than a threshold T3. When the continuation period maintained to rich air-fuel ratio by the third rich control reaches the threshold T3, regeneration of the catalyst 13 is complete.

If the judgment result of step 142 is YES, processing flow progresses to step 143, and resetting the flag Frich3 to zero is carried out. And this routine is terminated. If the judgment result of step 142 is NO, this routine is terminated without changing the flag Frich3.

If the judgment result of step 104 at which the judgment is carried out as to whether the flag Frich4 is zero is NO, processing flow progresses to step 151, and updating of the timer T is carried out.

At step 152, a judgment is carried out as to whether the timer T is more than a threshold T4. When the continuation period maintained to rich air-fuel ratio by the fourth rich control reaches the threshold T4, regeneration of the catalyst 13 is complete.

If the judgment result of step 152 is YES, processing flow progresses to step 153, and resetting the flag Frich4 to zero is carried out. And this routine is terminated. If the judgment result of step 152 is NO, this routine is terminated without changing the flag Frich4.

Figure 5:
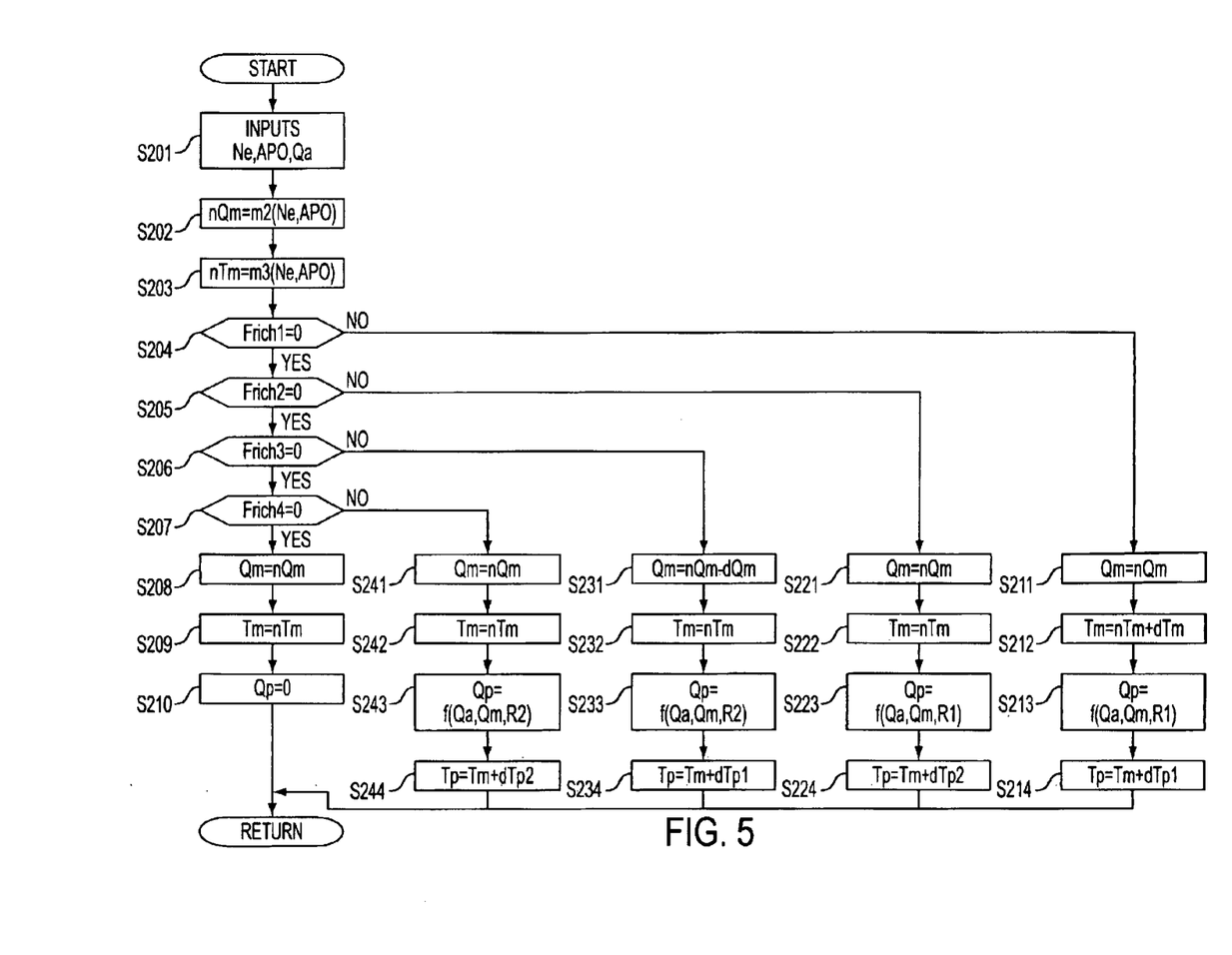
FIG. 5 is flow chart of routine to be carried out by control unit to calculate instruction values for a fuel injector.

FIG. 5 is flow chart of a fuel injection control routine. This routine is carried out at regular intervals (for example 10 ms).

At step 201, input of engine operating conditions (engine rotating speed Ne and accelerator opening APO) and intake air flow rate Qa is carried out. In addition, when making the air-fuel ratio of the exhaust gas rich, control which decreases the intake air flow rate Qa by decreasing degree of the throttle valve 5 is performed.

At step 202, calculation of value nQm based on the engine operating conditions is carried out. The value nQm is basic width of the pulse signal to be supplied to the injector 6 at time of the main fuel injection. That is, the value nQm indicates normal amount of fuel for the main fuel injection. The calculation is realized by looking up nQm in a map in which data of nQm vs engine operating conditions has been stored.

At step 203, calculation of value nTm based on the engine operating conditions is carried out. The value nTm is basic crank-angle of the pulse signal of the main fuel injection. That is, the value nTm indicates normal timing of the main fuel injection. The calculation is realized by looking up nTm in a map in which data of nTm vs engine operating conditions has been stored. When engine operating conditions are in the Region A, the value nTm suitable for the diffusion combustion is calculated. When engine operating conditions are in the Region B, the value nTm suitable for the premixed combustion is calculated.

At step 204, a judgment is carried out as to whether the flag Frich1 is zero.

If the judgment result of step 204 is YES, the first rich control is not performed. And processing flow progresses to step 205, and a judgment is carried out as to whether the flag Frich2 is zero.

If the judgment result of step 205 is YES, the second rich control is not performed. And processing flow progresses to step 206, and a judgment is carried out as to whether the flag Frich3 is zero.

If the judgment result of step 206 is YES, the third rich control is not performed. And processing flow progresses to step 207, and a judgment is carried out as to whether the flag Frich4 is zero.

If the judgment result of step 207 is YES, the fourth rich control is not performed. And processing flow progresses to step 208.

At step 208~210, calculation of instruction values suitable to normal control about the injectors 6 is carried out.

At step 208, calculation of value Qm is carried out. The value Qm is width of the pulse signal of the main fuel injection. That is, the value Qm indicates the main fuel injection amount. Here, the value nQm is substituted for the value Qm.

At step 209, calculation of value Tm is carried out. The value Tm is crank-angle. And the pulse signal of the main fuel injection is supplied to the injector 6 when crank-angle detected by the crank-angle sensor 32 coincides with the crank-angle indicated by the value Tm. That is, the value Tm indicates the main fuel injection timing. Here, the value nTm is substituted for the value Tm.

At step 210, calculation of value Qp is carried out. The value Qp is width of the pulse signal of the post fuel injection. That is, the value Qp indicates the post fuel injection amount. Here, zero is substituted for the value Qp.

When the injector 6 is controlled according to the instruction values calculated at steps 208~210, the main fuel injection amount becomes normal amount. And the main fuel injection timing becomes normal timing. The post fuel injection is not performed, the engine 1 outputs normal torque, and the air-fuel ratio of the exhaust gas becomes lean.

If the judgment result of step 204 is NO, processing flow progresses to step 211. At steps 211~214, calculation of instruction values suitable to first rich control is carried out.

At step 211, calculation of the value Qm is carried out. Here, the value nQm is substituted for the value Qm.

At step 212, calculation of the value Tm is carried out. Here, the value Tm is calculated by adding correction value dTm to the value nTm.

At step 213, calculation of the value Qp based on the intake air flow rate Qa, the value Qm and value R1 is carried out. Here, the value Qp is calculated so that excess air ratio of exhaust gas after performing the post fuel injection becomes equal to the value R1. The value R1 is less than 1.

Figure 6:
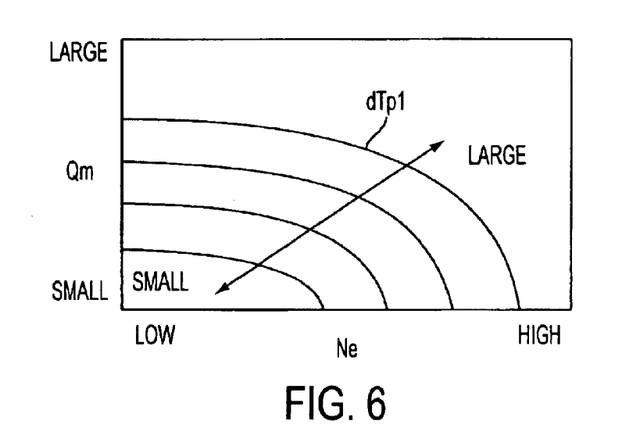
FIG. 6 is a map showing value dTp1 used in order to calculate post fuel injection timing.
Figure 7:
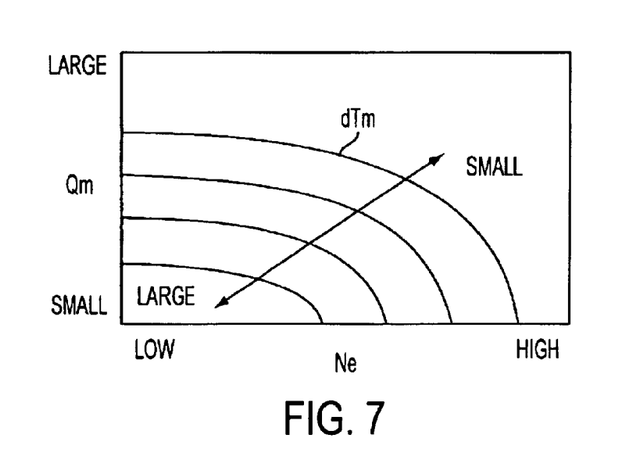
FIG. 7 is a map showing correction value dTm for main fuel injection timing.

At step 214, calculation of value Tp is carried out. The value Tp is crank-angle. And the pulse signal of the post fuel injection is supplied to the injector 6 when crank-angle detected by the crank-angle sensor 32 coincides with the crank-angle indicated by the value Tp. That is, the value Tp indicates the post fuel injection timing. Here, the value Tp is calculated by adding value dTp1 to the value Tm. The value dTp1 is smaller than 30 degree in crank-angle. That is, the value Tp of the post fuel injection timing is set up close to the value Tm of the main fuel injection timing. In addition, although a fixed value can be used as the value dTp1, it is better to use variable value which is calculated based on the value Qm and the engine speed Ne. An example is shown in FIG. 6. The value dTp1 is made small when the value Qm is small, and the value dTp1 is made small when the engine speed Ne is low. It is better to use variable value as the correction value dTm, when using variable value as the value dTp1. An example is shown in FIG. 7. The value dTm is made large when the value Qm is small, and the value dTm is made large when the engine speed Ne is low.

When the injector 6 is controlled according to the instruction values calculated at steps 211~214, the main fuel injection amount becomes normal amount. And the main fuel injection timing becomes slightly later than normal timing. Therefore, output torque by the main fuel injection becomes slightly smaller than normal torque. The air-fuel ratio of the exhaust gas becomes rich by the post fuel injection. The post fuel injection is performed immediately after the main fuel injection. Temperature in the combustion chamber at time immediately after the main fuel injection becomes high by combustion of the main fuel, and the temperature at time of the post fuel injection is higher than 1600° C. Therefore, the dehydrogenation reaction and the cracking reaction are active and a yield of $H_2$ becomes high. By supplying $H_2$ to the catalyst 13, even if activation of reduction function of the catalyst 13 is not sufficient, NOx released from the catalyst 13 can be reduced sufficiently. A small amount of torque is generated by the post fuel injection whose timing is close to the main fuel injection timing. Correction of the main fuel injection timing by the correction value dTm is performed in consideration of the small torque which can be estimated beforehand. Therefore, total torque by the main and post fuel injection becomes approximately equal to normal torque.

If the judgment result of step 205 is NO, processing flow progresses to step 221. At steps 221~224, calculation of instruction values suitable to second rich control is carried out.

At step 221, calculation of the value Qm is carried out. Here, the value nQm is substituted for the value Qm.

At step 222, calculation of the value Tm is carried out. Here, the value nTm is substituted for the value Tm.

At step 223, calculation of the value Qp based on the intake air flow rate Qa, the value Qm and the value R1 is carried out.

At step 224, calculation of the value Tp is carried out. Here, the value Tp is calculated by adding value dTp2 to the value Tm. The value dTp2 is larger than the value dTp1. That is, the value Tp is set up far from the value Tm. When the injector 6 is controlled according to the instruction values calculated at steps 221~224, the main fuel injection amount becomes normal amount. And the main fuel injection timing becomes normal timing. Therefore, output torque by the main fuel injection becomes normal torque. The air-fuel ratio of the exhaust gas becomes rich by the post fuel injection. The post fuel injection is performed at the time sufficiently separated from the main fuel injection, and temperature in the combustion chamber at time of the post fuel injection is low. Therefore, exhaust gas after the post fuel injection hardly contains $H_2$. Since the second rich control is chosen when activation of reduction function of the catalyst 13 is sufficiently, NOx released from the catalyst 13 is reduced sufficiently without $H_2$. Since increase of engine torque by the post fuel injection is very small, correction of the main fuel injection is not required.

If the judgment result of step 206 is NO, processing flow progresses to step 231. At steps 231~234, calculation of instruction values suitable to third rich control is carried out.

At step 231, calculation of the value Qm is carried out. Here, the value nOm is calculated by subtracting correction value dQm from the value nQm.

At step 232, calculation of the value Tm is carried out. Here, the value nTm is substituted for the value Tm.

At step 233, calculation of the value Qp based on the intake air flow rate Qa, the value Qm and value R2 is carried out. Here, the value Qp is calculated so that excess air ratio of exhaust gas after performing the post fuel injection becomes equal to the value R2. The value R2 is less than the value R1.

Figure 8:
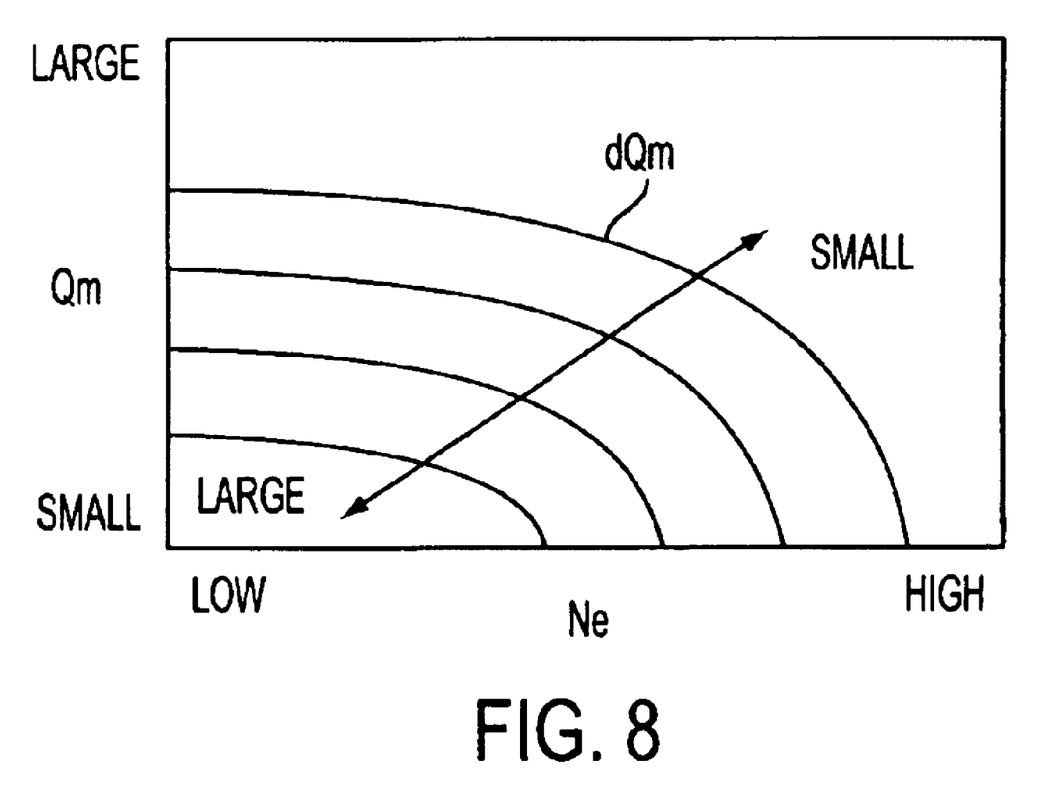
FIG. 8 is a map showing correction value dQm for main fuel injection amount.

At step 234, calculation of the value Tp is carried out. Here, the value Tp is calculated by adding the value dTp1 to the value Tm. The value Tp is set up close to the value Tm. It is better to use variable value as the correction value dQm, when using variable value as the value dTp1. An example is shown in FIG. 8. The value dQm is made large when the value Qm is small, and the value dQm is made large when the engine speed Ne is low.

When the injector 6 is controlled according to the instruction values calculated at steps 231~234, the main fuel injection amount becomes less than normal amount. And the main fuel injection timing becomes normal timing. Therefore, output torque by the main fuel injection becomes smaller than normal torque. The air-fuel ratio of the exhaust gas becomes rich by the post fuel injection. Since the value R2 is less than the value R1, the air-fuel ratio of the exhaust gas at time of the third rich control is richer than the air-fuel ratio of the exhaust gas at time of the first or second rich control. Although amount of the smoke to be generated by the post fuel injection is not little, amount of the smoke to be generated at time of the premixed combustion of the main fuel injection is little. Therefore, total amount of the smoke is within tolerance level. The post fuel injection is performed immediately after the main fuel injection. Because of high temperature in the combustion chamber at time of the post fuel injection, a yield of $H_2$ becomes high. And NOx released from the catalyst 13 can be reduced sufficiently with $H_2$. Torque is generated by the post fuel injection whose timing is close to the main fuel injection timing. Because of correction of the main fuel injection amount by the correction value dQm in consideration of the torque which can be estimated beforehand, total torque by the main and post fuel injection becomes approximately equal to normal torque.

If the judgment result of step 207 is NO, processing flow progresses to step 241. At steps 241~244, calculation of instruction values suitable to fourth rich control is carried out.

At step 241, calculation of the value Qm is carried out. Here, the value nQm is substituted for the value Qm.

At step 242, calculation of the value Tm is carried out. Here, the value nTm is substituted for the value Tm.

At step 223, calculation of the value Qp based on the intake air flow rate Qa, the value Qm and the value R2 is carried out.

At step 244, calculation of the value Tp is carried out. Here, the value Tp is calculated by adding value dTp2 to the value Tm. The value Tp is set up far from the value Tm.

When the injector 6 is controlled according to the instruction values calculated at steps 241~244, the main fuel injection amount becomes normal amount. And the main fuel injection timing becomes normal timing. Therefore, output torque by the main fuel injection becomes normal torque. The air-fuel ratio of the exhaust gas becomes rich by the post fuel injection. The post fuel injection is performed at the time sufficiently separated from the main fuel injection. Because of sufficient activation of reduction function of the catalyst 13, NOx released from the catalyst 13 is reduced sufficiently without $H_2$. Correction of the main fuel injection is not required.

Figure 9:
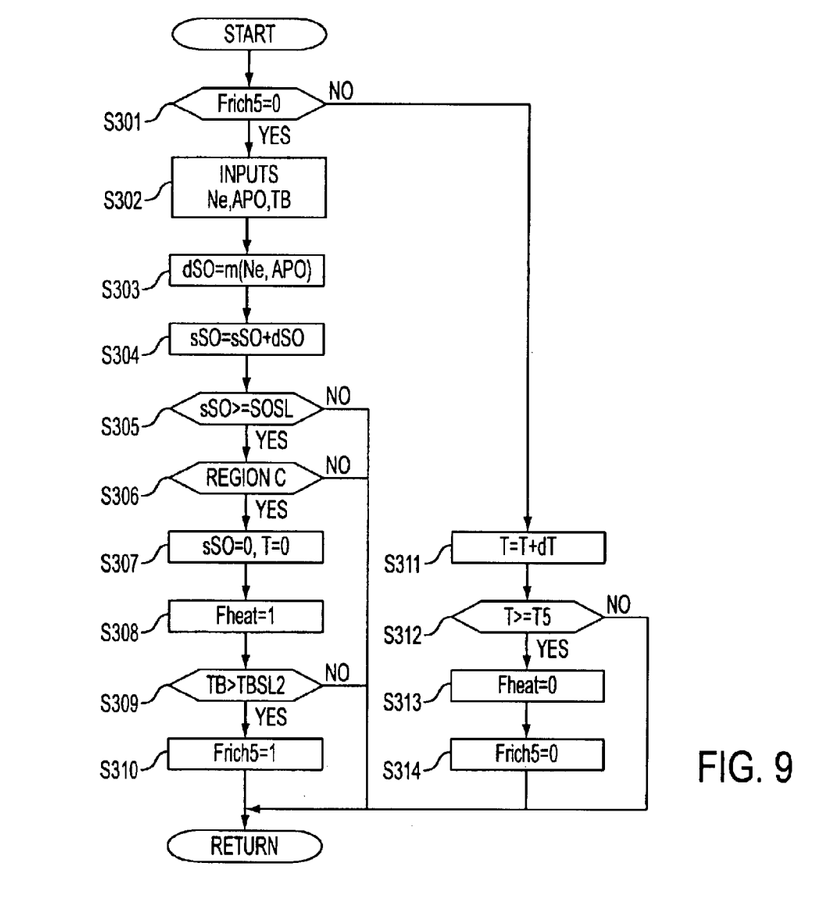
FIG. 9 is flow chart of a routine to be carried out by a control unit to judge regeneration timing of catalyst.

FIG. 9 is flow chart of a second regeneration timing judging routine. This routine is carried out at regular intervals (for example 10 ms). In the routine, a judgment as to whether the regeneration control should be performed is carried out based on amount of SOx stored in the catalyst 13. This routine can be omitted when sulfur content of fuel is very small.

At step 301, a judgment is carried out as to whether a flag Frich5 is zero. The flag Frich5 is zero until setting at step 310 of this routine is carried out.

If the judgment result of step 301 is YES, processing flow progresses to step 302, and input of the engine operating conditions and the catalyst temperature TB is carried out At step 303, calculation of value dSO based on the engine operating conditions is carried out. The value dSO indicates amount of SOx which is trapped by the catalyst 13 during the unit time. The calculation is realized by looking up dSO in a map in which data of dSO vs engine operating conditions has been stored.

At step 304, calculation of value sSO is carried out. The value sSO indicates total amount of SOx which has been stored in the catalyst 13.

At step 305, a judgment is carried out as to whether the value sSO is more than a threshold SOSL.

If the judgment result of step 305 is YES, processing flow progresses to step 306, and a judgment is carried out as to whether the engine operating conditions are in the Region C of FIG. 4.

If the judgment result of step 306 is YES, processing flow progresses to step 307, and resetting the value sSO to zero is carried out. And resetting the timer T to zero is also carried out.

At step 308, setting a flag Fheat to 1 is carried out. The flag Fheat is a flag which shows that catalyst heat control is performed. Specifically, when the flag Fheat is 1, control which decreases degree of opening of the throttle valve 5 to 50% is performed.

At step 309, a judgment is carried out as to whether the catalyst temperature TB is higher than a threshold TBSL2. The threshold TBSL2 is 550° C. in one example. Although high temperature (for example 700° C.) is required for releasing and reducing SOx stored in the catalyst 13, the temperature can be lowered by supplying $H_2$ to the catalyst 13.

If the judgment result of step 309 is YES, processing flow progresses to step 310, and setting the flag Frich5 to 1 is carried out.

If the judgment result of step 301 is NO, processing flow progresses to step 311, and updating of the timer T by adding the value dT to timer T is carried out.

At step 312, a judgment is carried out as to whether the timer T is more than a threshold T5. When the continuation period maintained to rich air-fuel ratio reaches the threshold T5, regeneration of the catalyst 13 is complete.

If the judgment result of step 312 is YES, processing flow progresses to step 313, and resetting the flag Fheat to zero is carried out.

At step 314, resetting the flag Frich5 to zero is carried out.

When the flag Frich5 is 1, the instruction values of the main and the post fuel injection are calculated at steps 211~214 (the first rich control) or steps 231~234 (the third rich control) of the fuel injection control routine. Therefore, the post fuel injection is performed immediately after the main fuel injection. $H_2$ is supplied to the catalyst 13.

The entire contents of Japanese Patent Application 2001-315879 (filed Oct. 12, 2001) are incorporated herein by reference.

Although the invention has been described above with reference to certain embodiments of the invention, the invention is not limited to the embodiments described above. Various modifications and variations of the embodiments described above will occur to those skilled in the art, in light of the above teachings, and are also considered a part of the present invention.

What is claimed is:

1. An exhaust gas purification device for a diesel engine having an injector injecting fuel directly into a combustion chamber of the engine, comprising:

a NOx trap catalyst trapping nitrogen oxides (NOx) contained in exhaust gas when an air-fuel ratio of the exhaust gas is leaner than stoichiometric air-fuel ratio, and reducing NOx stored in the catalyst when the air-fuel ratio of the exhaust gas is richer than stoichiometric air-fuel ratio; and a controller programmed to:

make a judgment as to whether the catalyst should be regenerated, an additional fuel injection being performed in accordance with the judgment;

calculate instruction values regarding a main fuel injection, in accordance with engine operating conditions and the judgment;

calculate instruction values regarding the additional fuel injection, when the judgment shows that the catalyst should be regenerated; and control the injector according to the instruction values regarding the main and the additional fuel injection, in order to regenerate the catalyst.

2. An exhaust gas purification device as claimed in claim 1, wherein the instruction values regarding the additional fuel injection include a value indicating a timing of the additional fuel injection.

3. An exhaust gas purification device as claimed in claim 2, wherein the controller is further programmed to calculate the value indicating the additional fuel injection timing which is suitable for generating hydrogen ($H_2$).

4. An exhaust gas purification device as claimed in claim 3, wherein the $H_2$ is generated in a dehydrogenation reaction and a cracking reaction.

5. An exhaust gas purification device as claimed in claim 2, wherein the controller is further programmed to calculate the value indicating the additional fuel injection timing when temperature in the combustion chamber becomes higher than approximately 1600° C.

6. An exhaust gas purification device as claimed in claim 2, wherein the controller is further programmed to calculate the value indicating the additional fuel injection timing within a bound of 30 degree in crank-angle from a timing of the main fuel injection.

7. An exhaust gas purification device as claimed in claim 1, wherein the controller is further programmed to:

calculate normal values regarding the main fuel injection based on the engine operating conditions; and calculate the instruction values regarding the main fuel injection by making a correction to the normal values, when the judgment shows that the catalyst should be regenerated.

8. An exhaust gas purification device as claimed in claim 7, wherein the correction decreases engine torque to be generated by the main fuel injection.

9. An exhaust gas purification device as claimed in claim 8, wherein the normal values include a value indicating a timing of the main fuel injection, and the correction retards the main fuel injection timing.

10. An exhaust gas purification device as claimed in claim 8, wherein the normal values include a value indicating an amount of the main fuel injection, and the correction decreases the main fuel injection amount.

11. An exhaust gas purification device as claimed in claim 8, wherein the engine is operable with diffusion combustion or premixed combustion, and the normal values include a value indicating a timing of the main fuel injection and a value indicating an amount of the main fuel injection, and the correction which is made at timing of the diffusion combustion retards the main fuel injection timing, and the correction which is made at timing of the premixed combustion decreases the main fuel injection amount.

12. An exhaust gas purification device as claimed in claim 1, wherein the controller is further programmed to:

calculate normal values regarding the main fuel injection based on the engine operating conditions;

make a second judgment as to whether the catalyst is active;

calculate the instruction values regarding the main fuel injection by making a correction to the normal values, when the judgment shows that the catalyst should be regenerated and the second judgment shows that the catalyst is inactive; and calculate the instruction values regarding the main fuel injection according to the normal values without the correction, when the judgment shows that the catalyst should be regenerated and the second judgment shows that the catalyst is active.

13. An exhaust gas purification device as claimed in claim 12, wherein the instruction values regarding additional fuel injection include a value indicating a timing of the additional fuel injection, and the controller is further programmed to:

calculate the instruction value regarding the additional fuel injection timing which is close to a timing of the main fuel injection, when the judgment shows that the catalyst should be regenerated and the second judgment shows that the catalyst is inactive; and calculate the instruction value regarding the additional fuel injection timing which is far from the timing of the main fuel injection, when the judgment shows that the catalyst should be regenerated and the second judgment shows that the catalyst is active.

14. An exhaust gas purification device for a diesel engine having an injector injecting fuel directly into a combustion chamber of the engine, comprising:

a NOx trap catalyst trapping nitrogen oxides (NOx) contained in exhaust gas when an air-fuel ratio of the exhaust gas is leaner than stoichiometric air-fuel ratio, and reducing NOx stored in the catalyst when the air-fuel ratio of the exhaust gas is richer than stoichiometric air-fuel ratio;

means for making a judgment as to whether the catalyst should be regenerated performing an additional fuel injection according to the judgment;

means for calculating instruction values regarding a main fuel injection, in accordance with engine operating conditions and the judgment;

means for calculating instruction values regarding the additional fuel injection, when the judgment shows that the catalyst should be regenerated; and means for controlling the injector according to the instruction values regarding the main and the additional fuel injection, in order to regenerate the catalyst.

15. An exhaust gas purification method for a diesel engine having an injector injecting fuel directly into a combustion chamber of the engine, comprising:

providing a NOx trap catalyst trapping nitrogen oxides (NOx) contained in exhaust gas when an air-fuel ratio of the exhaust gas is leaner than stoichiometric air-fuel ratio, and reducing NOx stored in the catalyst when the air-fuel ratio of the exhaust gas is richer than stoichiometric air-fuel ratio; and making a judgment as to whether the catalyst should be regenerated, and performing an additional fuel injection according to the judgment;

calculating instruction values regarding a main fuel injection, in accordance with engine operating conditions and the judgment;

calculating instruction values regarding the additional fuel injection, when the judgment shows that the catalyst should be regenerated; and controlling the injector according to the instruction values regarding the main and the additional fuel injection, in order to regenerate the catalyst.

* * * * *